United States Patent Office 3,560,461
Patented Feb. 2, 1971

3,560,461
METHOD OF SAPONIFYING VINYL ACETATE COPOLYMERS
Kiyoshi Yonezu, Kinichi Nishioka, and Kazuo Mukumoto, Kurashiki, Japan, assignors to Kurashiki Rayon Co., Ltd., Okayama Prefecture, Japan
No Drawing. Filed Nov. 29, 1966, Ser. No. 597,570
Claims priority, application Japan, Dec. 4, 1965, 40/74,715
Int. Cl. C08f 27/14
U.S. Cl. 260—87.3
7 Claims

ABSTRACT OF THE DISCLOSURE

Polymers of ethylene, vinyl acetate and a monomer having the structure

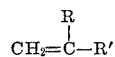

wherein R is selected from the group consisting of hydrogen and methyl and R' is selected from the group consisting of —COOR'', —C$_6$H$_5$, —Cl, —CN, —CH$_3$ and —CH=CH$_2$, and R'' represents hydrogen or lower alkyl, the mole ratio of ethylene to vinyl acetate and the monomer being in the range of about 0.5:1 to 9:1 and the mole ratio of the monomer to vinyl acetate being in the range of about 0:1 to 0.1:1 are saponified by contacting in a reaction tower maintained under saponification reaction conditions a solution of the polymer and a basic catalyst countercurrently with alcohol vapor in an amount sufficient to effect saponification and remove from the reaction tower as overhead acetic acid ester formed as a result of the saponification reaction.

---

This invention relates to a method of producing saponified ethylene-derived polymers, and more specifically to a method of continuously saponifying by alcoholysis, ethylene polymers containing vinyl acetate as one component.

It is well known in the art that ethylene-vinyl acetate polymers are saponified with a catalyst for alcoholysis such as a strong base or alkali metal alcoholate in an alcohol such as methanol or ethanol. In these saponifications, however, there are usually difficulties involved in preventing intermixing of a small amount of water in the saponification reaction system. The presence of water in the reaction system is undesirable in that it causes rapid decomposition of the catalyst by its reaction with the acetic acid ester produced in the course of the saponification. For this reason, the prior art techniques have called for use of large amounts of catalysts and extended periods of reaction time in order to obtain highly saponified ethylene-derived polymers, e.g., containing not more than 10 molar percent of residual acetyl groups. The use of excess catalyst and long reaction times is not only economically disadvantageous but also adversely affects the quality of the products, for example, often provides discolored saponified polymers.

It is, therefore, an object of the present invention to provide highly saponified polymers, for example, containing not more than 10 molar percent of residual acetyl groups, from ethylene-derived polymers by using a small amount of catalyst and short reaction times and, in particular, to conduct this process in a continuous operation. The object of the invention is attained by feeding an organic solvent solution of ethylene-vinyl acetate polymer containing a catalyst for alcoholysis, into a tower reactor maintained under saponification reaction conditions. The polymer solution is charged into an upper part of the tower while feeding alcohol into the bottom portion of the tower. The polymer-catalyst solution flows down the tower and countercurrently contacts alcohol vapor passing up the tower. In this manner the saponification is affected while removing acetic acid ester vapor from the reaction system together with excess alcohol vapor. The polymer thus saponified is removed from the bottom part of the tower in the form of a solution, while the vapors of alcohol, acetic acid ester, and other substances are taken overhead, that is, from the top portion of the tower and led into an external condenser for ultimate recovery.

The polymers subjected to saponification in accordance with the present invention may be a copolymer of ethylene and vinyl acetate per se or interpolymers of ethylene, vinyl acetate and other polymerizable vinyl monomers. In general, the polymers subjected to the process of the invention may be represented by the following general formula:

(C$_2$H$_4$)$_x$(CH$_2$CHOCOCH$_3$)$_y$(CH$_2$CRR')$_z$ where R is hydrogen or methyl group, R' is —COOR'', —C$_6$H$_5$, —Cl, —CN, —CH$_3$, or CH$_2$=CH—, x and y are numbers greater than 0, z is a number having a value of 0 or greater than 0, and the ratio of x:(y+z) is in the range from about 0.5:1 to 9:1 and the ratio of z:y ranges from about 0:1 to 0.1:1. R'' in the radical —COOR'', represents hydrogen or lower alkyl, especially methyl. Illustrative of the ethylenic polymers of the invention are ethylene-vinyl acetate copolymer, ethylene-vinyl acetate-methyl acrylate polymer, ethylene-vinyl acetate-styrene polymer, ethylene-vinyl acetate-vinyl chloride polymer, ethylene-vinyl acetate-acrylonitrile polymer, ethylene-vinyl acetate-propylene polymer, and ethylene-vinyl acetate-butadiene polymer. The ratio of the components of the polymer is such as to give a saponified polymer which is soluble in alcohols.

The solvent of the polymer solution fed into the reaction tower may be any solvent capable of dissolving the polymer, as for example, lower alkanols such as methanol, ethanol, n-propanol, isopropanol, n-butanol, sec.-butanol, tert-butanol; aromatic hydrocarbon solvents such as benzene, toluene, xylene; ketonic solvents such as acetone, methyl ethyl ketone and aliphatic hydrocarbon solvents such as n-hexane, and isooctane. These solvents may be used either singly or in combination. While the concentration of the polymer in the solution introduced into the reaction tower may vary widely, extremely high concentrations should be avoided because they tend to increase the viscosity of the solutions to degrees that render operations difficult. Smooth operations are insured when the concentrations of the polymers are below 40 percent by weight based on the weight of the solution.

The alcohol vapor passing upwardly through the reaction tower is preferably a lower alkanol such as methanol, ethanol, n-propanol, isopropanol, n-butanol, sec-butanol, tert-butanol, or the like. Of these alcohols, methanol is particularly preferred. The temperature of the alcohol vapor is at least equal to the boiling point of the alcohol at the tower operating pressure. The saponification may be conducted at below or above atmospheric pressure. In actual practice, the preferred pressure for the saponification reaction is in the range of from about 0.01 to 5 atmospheres.

In general, the amount of alcohol fed into the reaction tower is that sufficient to remove essentially all of the acetic acid ester produced during the saponification out of the reaction tower as overhead. For example, in saponifying an ethylene-vinyl acetate copolymer having an ethylene content of 40 mol percent, it is desired to feed in about 2.2 g. or more of methanol vapor per gram of said copolymer. If the ethylene content is 50 mol percent, the amount of methanol introduced is about 2 g. or more per gram of said copolymer, and if the ethylene content is 80 mol percent, the alcohol is about 0.8 g. or more per gram of copolymer for removal of essentially all of the acetic acid ester.

Suitable catalysts for the alcoholysis of the invention are basic catalysts which include strong bases such as caustic soda or caustic potash or an alkali metal alcoholate such as sodium methylate or potassium ethylate. The catalyst is used in a catalytic amount, the preferred amount being dependent upon the type of the catalyst, the ethylene content of the particular polymer, the desired degree of saponification, and other factors. Generally from about 0.01 to 0.6 mole of a catalyst is employed per mole of vinyl acetate in the polymer.

The saponification temperature is preferably in the range of about 40° and 100° C., though it may be suitably selected by varying the temperature of the alcoholic vapor passing upwardly through the tower. At a temperature below about 40° C. the reaction rate will be too low for practical operation, while a temperature above about 100° C. may have adverse effects upon the quality of the saponified polymer obtained. The tower employed for the reaction of the invention may be an ordinary plate tower, perforated plate tower, packed tower, wetted-wall tower, or the like, and usually a plate tower which permits a suitable residence time is preferred.

According to the method of the invention, the amount of catalyst can be decreased from one-third to one-half and the reaction time shortened to one-fifth to one-half those used in the conventional batch saponification system which depend solely upon heating. Moreover, because of the ease with which the continuous system can be operated, the method of the invention is highly beneficial for the recovery of by-product acetic acid ester.

The present invention is further illustrated by the following examples.

EXAMPLE 1

Into the top of a 20 plate bubble cap tower, 0.85 meter in diameter, was fed a methanol solution of an ethylene-vinyl acetate copolymer having an ethylene content of 40 mol percent and a vinyl acetate content of 60 mol percent, at a rate of 1.2 tons per hour (t./hr.). The polymer concentration in the methanol solution was 40 wt. percent. A methanol solution containing 15 wt. percent of caustic soda was also introduced into the top of the tower at a rate of 0.24 t./hr. From the bottom of the tower, methanol vapor at its boiling point (65° C.) was fed in at a rate of 1.0 t./hr.

After a residence time of 30 minutes, a saponified polymer containing 1.2 mol percent of residual acetyl groups was taken out of the bottom of the tower in a methanol solution, at a rate of 0.29 t./hr. The amount of methyl acetate in the solution was 0.05 wt. percent. The mixed methanol vapor and methyl-acetate was led out of the tower top into an external condenser, through which it was discharged at a rate of 1.5 t./hr. The condensate contained 25 wt. percent of methyl acetate and the rate of recovery of methyl acetate, i.e., the percentage of recovered methyl acetate on the basis of the total amount of methyl acetate produced was 85 wt. percent. Throughout the reaction the temperature inside the tower was 62° C. in the top portion and 65° C. in the bottom portion.

If a saponified polymer containing 1.2 mol percent of residual acetyl groups is obtained through a reaction at 63° C. by a conventional batch method, the amount of catalyst required would be 2.5 times as much as the amount employed above and the reaction time would be four times longer.

EXAMPLE 2

The same type of tower described in Example 1 was used in this example. From the top of the tower, a tertiary butanol solution containing an interpolymer in a concentration of 35 wt. percent, which had an ethylene content of 60 mol percent, a vinyl acetate content of 38 mol percent and a methyl acrylate content of 2 mol percent was fed into the tower at a rate of 0.95 t./hr. Also, a methanol solution containing 10 wt. percent of sodium methylate was introduced at a rate of 0.13 t./hr. through the opening on the tower top. From the bottom of the tower, methanol vapor at its boiling point (65° C.) was fed into the tower at a rate of 0.86 t./hr.

After a residence time of 40 minutes, a saponified polymer containing 1.7 mol percent of residual acetyl groups was obtained in a mixed tertiary butanol-methanol solution at a rate of 0.22 t./hr. During the reaction the temperature inside the tower ranged from 63.5° to 65° C.

The amount of catalyst employed above would have to be doubled and the reaction time trebled if a saponified polymer containing 1.7 mol percent of residual acetyl groups is to be obtained through a reaction at 64° C. by the batch system in the usual method.

EXAMPLE 3

Through the top, of the same type of tower employed in Example 1, was fed a toluene solution containing 20 wt. percent of a polymer, which had an ethylene content of 85 mol percent and a vinyl acetate content of 15 mol percent, at a rate of 0.4 t./hr., and a methanol solution of caustic soda with a concentration of 15 wt. percent, at a rate of 0.052 t./hr. From the bottom of the tower, methanol vapor at its boiling point (65° C.) was supplied at a rate of 0.2 t./hr.

After a residence time of 100 minutes, a saponified polymer containing 0.8 mol percent of residual acetyl groups was obtained in the form of a mixed toluene-methanol solution, at a rate of 0.067 t./hr. The tower temperature was between 64° and 65.5° C.

If a saponified polymer containing 0.8 mol percent of residual acetyl groups was to be obtained through a reaction at 64° C. by the conventional batch system, the amount of catalyst and the reaction time as above specified would both have to be doubled.

EXAMPLE 4

From the top of the same type of tower used in Example 1, was fed a methanol solution containing 25 wt. percent of a polymer having an ethylene content of 40 mol percent, a propylene content of 5 mol percent and a vinyl acetate content of 55 mol percent at a rate of 0.9 t./hr. Also, a methanol solution containing 15 wt. percent of caustic soda was fed in from the top at a rate of 0.11 t./hr. From the bottom of the tower, methanol vapor at 80° C. was forced into the tower at a rate of 0.48 t./hr. The pressure inside the tower was kept at 1.4 atm.

After a residence time of 45 minutes, a saponified polymer containing one molar percent of residual acetyl groups was obtained at a rate of 0.14 t./hr. The temperature inside the tower was in the range of 77° to 80° C.

The embodiments of the invention in which an exclusive property or privilege is claimed are defined as follows:

1. A method for the saponification of polymers of ethylene, vinyl acetate and a monomer having the structure

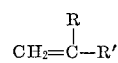

wherein R is selected from the group consisting of hydrogen and methyl and R' is selected from the group consisting of —COOR", —C$_6$H$_5$, —Cl, —CN, —CH$_3$ and —CH=CH$_2$, and R" represents hydrogen or lower alkyl, the mole ratio of ethylene to vinyl acetate and said monomer being in the range of about 0.5:1 to 9:1 and the mole ratio of said monomer to vinyl acetate being in the range of about 0:1 to 0.1:1 which comprises contacting in a reaction tower maintained under saponification reaction conditions a solution of said polymer and a basic catalyst countercurrently with alcohol vapor in an amount sufficient to effect saponification and remove from the reaction tower as overhead acetic acid ester formed as a result of the saponification reaction.

2. A method according to claim 1 wherein the polymer to be saponified is an ethylene-vinyl acetate polymer having an ethylene-vinyl acetate molar ratio of from 0.5:1 to 9:1.

3. A method according to claim 1 wherein the solution of the polymer is a methanol solution.

4. A method according to claim 1 wherein the temperature of saponification reaction ranges from about 40° to 100° C.

5. A method according to claim 1 wherein the pressure of the saponification reaction ranges from about 0.01 to 5 atmospheres.

6. A method of claim 1 wherein the alcohol vapor is methanol.

7. A method for the saponification of ethylene-vinyl acetate polymer having an ethylene to vinyl acetate molar ratio of from 0.5:1 to 9:1 which comprises contacting in a reaction tower maintained at a temperature of about 40° to 100° C. and a pressure of from about 0.01 to 5 atmospheres, a methanol solution of said polymer and a basic catalyst countercurrently with methanol vapor in an amount sufficient to effect saponification and remove from the reaction tower as overhead acetic acid ester formed as a result of the saponification reaction.

References Cited

UNITED STATES PATENTS

| | | | |
|---|---|---|---|
| 2,386,347 | 10/1945 | Roland | 260—86 |
| 2,480,471 | 8/1949 | Ittner | 260—415 |
| 2,495,071 | 1/1950 | Mills | 260—415 |
| 2,703,794 | 3/1955 | Roedel | 260—87.3 |

JOSEPH L. SCHOFER, Primary Examiner

J. KIGHT III, Assistant Examiner

U.S. Cl. X.R.

260—80.81, 80.7

UNITED STATES PATENT OFFICE
CERTIFICATE OF CORRECTION

Patent No. 3,560,461            Dated February 2, 1971

Inventor(s) Kiyoshi Yonezu, Kinichi Nishioka, and Kazuo Muku

It is certified that error appears in the above-identified paten and that said Letters Patent are hereby corrected as shown below:

Claim 1, column 4, line 73, after the word "condit a" add --downwardly-slowing--.

Claim 1, column 4, line 73, delete "said" and inse before the word "polymer" --the--.

Claim 1, column 4, line 73, delete the word "and".

Claim 1, column 4, line 74, before "a basic" inse --in the presence of--.

Claim 1, column 5, line 1, after the word "as" ins --an--.

Claim 1, column 5, line 1, after the word "overhea insert --vapor--.

Claim 1, column 5, line 2, strike "result" and ins --by-product--.

Claim 7, column 6, line 2, after the word "a" inse --downwardly-flowing--.

Claim 7, column 6, line 2, after the word "polymer

UNITED STATES PATENT OFFICE
CERTIFICATE OF CORRECTION

Patent No. 3,560,461            Dated February 2, 1971

Inventor(s) Kiyoshi Yonezu, Kinichi Nishioka, and Kazuo Muku

PAGE - 2

It is certified that error appears in the above-identified patent and that said Letters Patent are hereby corrected as shown below:

(continued)

omit "and" and insert --in the presence of--.

Claim 7, column 6, line 5, after the word "as" insert --an--.

Claim 7, column 6, line 5, after the word "overhead" insert the word --vapor--.

Claim 7, column 6, line 6, after the words "as a" omit the word "result" and insert --by-product.

Signed and sealed this 22nd day of February 1972.

(SEAL)
Attest:

EDWARD M. FLETCHER, JR.    ROBERT GOTTSCHALK
Attesting Officer    Commissioner of Patents